US007743503B2

(12) United States Patent
Okabe et al.

(10) Patent No.: US 7,743,503 B2
(45) Date of Patent: Jun. 29, 2010

(54) METHOD FOR MANUFACTURING INKJET HEAD

(75) Inventors: Takehito Okabe, Atsugi (JP); Nobuhiko Sato, Sagamihara (JP); Makoto Kurotobi, Yokohama (JP); Kenichi Takeda, Yokohama (JP); Toshihiro Ifuku, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 400 days.

(21) Appl. No.: 11/215,974

(22) Filed: Sep. 1, 2005

(65) Prior Publication Data

US 2006/0049135 A1 Mar. 9, 2006

(30) Foreign Application Priority Data

Sep. 6, 2004 (JP) ............................ 2004-258367

(51) Int. Cl.
*B23P 17/00* (2006.01)
*G01D 15/00* (2006.01)

(52) U.S. Cl. ...................... 29/890.1; 29/25.35; 29/830; 29/831; 29/832; 216/27

(58) Field of Classification Search ............... 29/25.35, 29/890.1, 830, 831, 832, 611; 216/27; 347/68-70, 347/93, 94, 45; 427/100; 310/311, 348, 310/313 A, 328, 327
See application file for complete search history.

(56) References Cited

U.S. PATENT DOCUMENTS

| | | | | |
|---|---|---|---|---|
| 5,242,863 | A * | 9/1993 | Xiang-Zheng et al. | 438/53 |
| 6,019,458 | A * | 2/2000 | Shimada et al. | 347/70 |
| 6,113,218 | A * | 9/2000 | Atobe et al. | 347/54 |
| 6,143,190 | A * | 11/2000 | Yagi et al. | 216/27 |
| 6,326,279 | B1 * | 12/2001 | Kakizaki et al. | 438/406 |
| 6,398,349 | B1 * | 6/2002 | Murai | 347/68 |
| 6,467,876 | B1 * | 10/2002 | Karasawa et al. | 347/45 |
| 6,471,340 | B2 * | 10/2002 | Meyer | 347/65 |
| 6,481,074 | B1 * | 11/2002 | Karlinski | 29/25.35 |
| 6,502,930 | B1 * | 1/2003 | Shimada et al. | 347/71 |
| 6,547,373 | B2 * | 4/2003 | Kitahara | 347/68 |
| 6,551,851 | B2 * | 4/2003 | Gamble et al. | 438/53 |
| 6,555,443 | B1 * | 4/2003 | Artmann et al. | 438/458 |
| 6,622,373 | B1 * | 9/2003 | Tu | 29/611 |
| 6,927,084 | B2 | 8/2005 | Fukui et al. | |
| 7,045,935 | B2 | 5/2006 | Matsuda et al. | |
| 7,053,526 | B2 | 5/2006 | Unno et al. | |

(Continued)

FOREIGN PATENT DOCUMENTS

JP 7-276636 A 10/1995

(Continued)

OTHER PUBLICATIONS

S.D. Collins, "Etch Stop Techniques for Micromachining," *J. Electrochem. Soc.*, vol. 44, No. 6, Jun. 1997, pp. 2242-2262.

*Primary Examiner*—Derris H Banks
*Assistant Examiner*—Tai Nguyen
(74) *Attorney, Agent, or Firm*—Fitzpatrick, Cella, Harper & Scinto

(57) ABSTRACT

A method for manufacturing an inkjet head includes providing a piezoelectric substrate having a porous structure, a diaphragm on the porous structure, and a piezoelectric substance layer on the diaphragm, and forming a cavity by etching out the porous structure from the piezoelectric substrate.

8 Claims, 4 Drawing Sheets

U.S. PATENT DOCUMENTS

| | | | |
|---|---|---|---|
| 7,059,711 | B2 | 6/2006 | Aoto et al. |
| 2003/0222948 | A1* | 12/2003 | Higuchi et al. ................ 347/70 |
| 2004/0155559 | A1 | 8/2004 | Ifuku et al. |
| 2005/0168112 | A1 | 8/2005 | Aoki et al. |
| 2005/0189849 | A1 | 9/2005 | Ifuku et al. |
| 2005/0219793 | A1 | 10/2005 | Matsuda et al. |
| 2006/0012648 | A1 | 1/2006 | Ifuku et al. |
| 2006/0046319 | A1 | 3/2006 | Takeda |

FOREIGN PATENT DOCUMENTS

| | | | |
|---|---|---|---|
| JP | 9-48115 | A | 2/1997 |
| JP | 2976479 | B2 | 9/1999 |
| JP | 11-277741 | A | 10/1999 |
| JP | 2002-234156 | A | 8/2002 |

* cited by examiner

METHOD FOR MANUFACTURING INKJET HEAD

BACKGROUND OF THE INVENTION

1. Field of the Invention

The present invention relates to an inkjet head that sprays drops of ink on a recording medium, such as paper, to form an ink image, and also relates to a method for manufacturing the inkjet head.

2. Description of the Related Art

The following are examples of conventional technologies of the inkjet head.

(1) Japanese Patent Publication No. 2976479

Conventionally, a pressure-generating means that sprays drops of ink from a cavity in the inkjet head has been provided to each cavity, for example, by an adhesion process. However, according to Japanese Patent Publication No. 2976479, the pressure-generating means is provided on a silicon substrate by a process other than an adhesion process.

(2) Japanese Patent Laid-Open No. 07-276636

Japanese Patent Laid-Open No. 07-276636 defines the orientation of a crystal plane on a cavity wall in a method for forming the cavity by etching a silicon substrate.

Problem 1: In such conventional technologies, the shape of the cavity depends on the anisotropic etching of the single-crystal silicon. Since the etching, in turn, depends on the crystal structure of the single-crystal silicon, the shape of the cavity is limited by the crystal structure of the single-crystal silicon. In general, the cavity has a (111) face of the single-crystal silicon. The etching rate is low on the (111) face. Thus, the etching based on the orientation of the crystal plane produces a cavity wall that is not perpendicular to the silicon substrate, resulting in a lower cavity density.

The cavity wall is required to have an affinity for ink to prevent the deposition of air bubbles.

Problem 2: Conventionally, the etching of the silicon substrate has been performed by selective etching based on the difference in the concentration of doped p-type impurities. However, the selection ratio of the selective etching is several tens at the highest. Thus, when both a thin film portion of the substrate and the cavity portion are made of silicon, the thickness of the thin film portion may be poorly controlled and may vary. Japanese Patent Laid-Open No. 2002-234156 discloses a method using a silicon-on-insulator (SOI) substrate, in which a buried silicon oxide layer serves as an etch stop material. In alkaline etching, the etching rate of silicon oxide is less than one-thousandth of that of silicon and accordingly the selectivity is excellent.

However, in alkaline etching, heat treatment during the formation of a diaphragm or the subsequent formation of pressure-generating means or peripheral circuitry may cause precipitation of oxygen in the substrate. The precipitated oxide acts as a mask during the etching because of its low etching rate for an alkaline solution, and thus may cause nonuniform etching. Furthermore, such an oxide deposited on the diaphragm may cause nonuniform mechanical properties in the diaphragm, leading to fracture or crack of the diaphragm.

Problem 3: An SOI wafer is about 4 to 10 times as expensive as a single-crystal silicon wafer. In addition, when an SOI wafer having a thick thin-film layer is manufactured by lamination and polishing, variations in the thickness of the SOI layer, which are about ±0.5 μm, cause variations in the thickness of the thin film portion.

SUMMARY OF THE INVENTION

To solve the problems described above, the present invention provides a method for manufacturing an inkjet head, comprising providing a first substrate that includes a piezoelectric substance layer and a diaphragm formed on a porous structure, and etching out the porous structure from the first substrate to form a cavity.

The present invention also provides an inkjet head comprising a piezoelectric substance layer, a diaphragm provided with the piezoelectric substance layer, and a cavity, wherein the diaphragm is made of silicon containing $5\times10^{17}/cm^3$ or less of oxygen.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
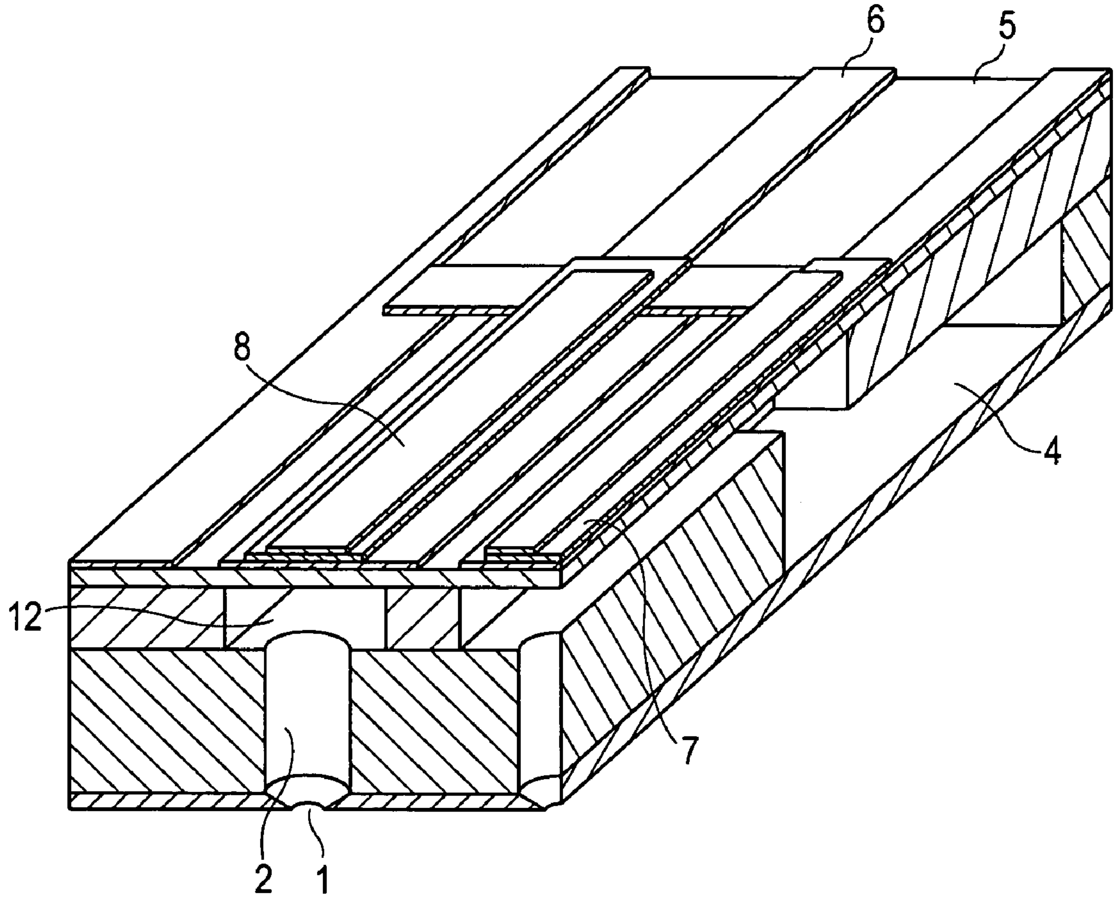
FIG. 1 is a perspective view of an inkjet head according to an embodiment of the present invention.

The best mode for carrying out the invention will be described in detail with reference to the drawings. FIG. 1 shows the structure of an inkjet head according to an embodiment of the present invention. The inkjet head includes a discharge opening 1, a communicating hole (liquid path) 2 that connects the discharge opening 1 with a cavity 12, a common liquid chamber 4, a diaphragm 5, a lower electrode 6, a piezoelectric film (piezoelectric substance layer) 7, and an upper electrode 8. The piezoelectric film 7 is rectangular in FIG. 1 but may be elliptical, circular, or parallelogrammatic.

Figure 2:
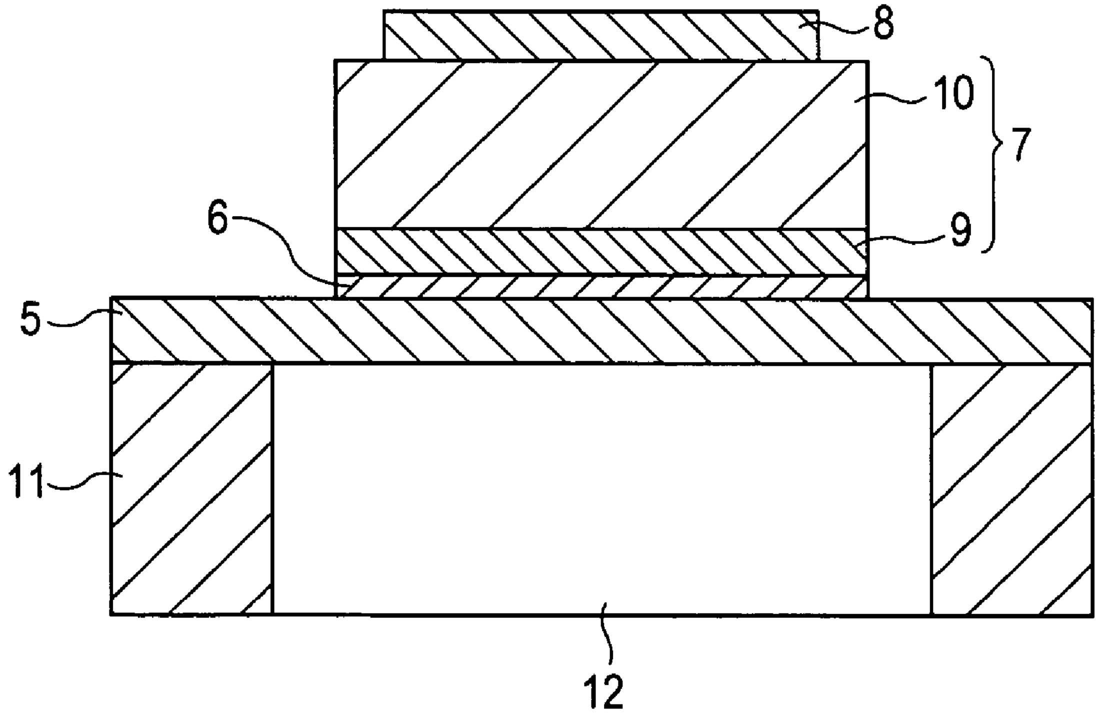
FIG. 2 is a transverse cross-sectional view of a portion of the inkjet head of FIG. 1 showing piezoelectric film in greater detail.

The piezoelectric film 7 will be described in detail with reference to FIG. 2. FIG. 2 is a transverse cross-sectional view of a portion of the inkjet head of FIG. 1 showing the piezoelectric film in greater detail. The piezoelectric film 7 is composed of a first piezoelectric substance sublayer 9 and a second piezoelectric substance sublayer 10. The diaphragm 5 and the lower electrode 6 may be separated by a buffer layer that controls crystallinity. The lower electrode 6 and the upper electrode 8 may have a multilayer structure. The cross section of the piezoelectric film 7 is rectangular in FIG. 2 but may be trapezoidal or inverted trapezoidal. The first piezoelectric substance sublayer 9 and the second piezoelectric substance sublayer 10 may be exchanged with each other, depending on the method of fabricating the device. Even when the first piezoelectric substance sublayer 9 and the second piezoelectric substance sublayer 10 are exchanged with each other, the present invention can have the same effect.

The lower electrode 6 extends longer than the piezoelectric film 7. The upper electrode 8 extends in the direction opposite to the lower electrode 6 and is connected to a power supply (not shown). In FIGS. 1 and 2, the patterned lower electrode 6 may be formed independently of the piezoelectric film 7.

The thickness of the diaphragm 5 in the inkjet head according to the present invention is in the range of 0.1 to 50 μm, and can be in the range of 0.5 to 10 μm, or in the range of 1.0 to 6.0 μm. When a buffer layer is disposed between the diaphragm 5 and the lower electrode 6, the total thickness of the diaphragm 5 and the buffer layer is in the range described above. The thicknesses of the lower electrode 6 and the upper electrode 8 are in the range of 0.05 to 0.4 μm and can be in the range of 0.08 to 0.2 μm. The width of a cavity 12 in a silicon substrate 11 is in the range of 30 to 180 μm. The length of the cavity 12 depends on the number of drops of ink to be sprayed and is generally in the range of 0.3 to 6.0 mm. The discharge opening 1 may be circular or star-shaped and can have a diameter of 7 to 30 μm.

The discharge opening 1 can taper down to a narrow tip. The length of the communicating hole 2 can be in the range of 0.05 to 0.5 mm. When the communicating hole 2 has a length greater than 0.5 mm, the discharge speed of the drops of ink may be decreased. On the other hand, when the communicating hole 2 has a length smaller than 0.05 mm, the discharge speed of the drops of ink from each discharge opening may vary greatly.

The lower electrode 6 and the upper electrode 8 may be made of a metallic material or an oxide material. Examples of the metallic material include Au, Pt, Ni, Cr, and Ir. The metallic material may be laminated on Ti or Pb. Examples of the oxide material include a strontium titanium oxide (STO), a strontium ruthenium oxide (SRO), $IrO_2$, $RuO_2$, and $Pb_2Ir_2O_7$, each doped with La or Nb. Desirably, the lower electrode 6 and/or the upper electrode 8 has a crystal structure of the metallic material or the oxide material. The lower electrode 6 and the upper electrode 8 may or may not be made of the same material and may or may not have the same structure. One of the lower electrode 6 and the upper electrode 8 acts as a common electrode and the other acts as a drive electrode.

A method for manufacturing the inkjet head according to the present invention will be described below with reference to FIG. 3. In the method for manufacturing the inkjet head according to the present invention, the production of a piezoelectric substrate A1 mainly involves a process for producing a nozzle pattern on the backside of the substrate, an anodization process, a process for forming a diaphragm, a process for forming a piezoelectric substance, and an etching process. Then, the piezoelectric substrate A1 is laminated to a nozzle plate A2 in a lamination process.

In FIGS. 3A to 3F, the piezoelectric substrate A1 includes cavities 30 and a diaphragm 18. The nozzle plate A2 includes a communicating hole, a discharge opening, and a common liquid chamber.

1. Formation of Cavity (1) Patterning of Anodization Area

Figure 3A:
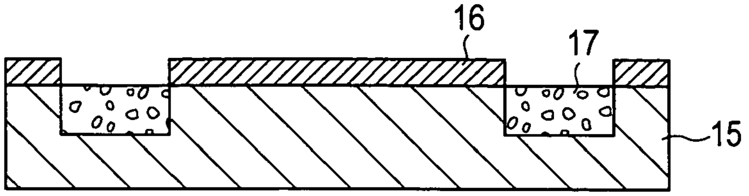
FIGS. 3A to 3F are schematic views illustrating a method for manufacturing an inkjet head according to an embodiment of the present invention.

As shown in FIG. 3A, a film resistant to anodization 16 is formed on a principal surface of a single-crystal silicon substrate 15 that has top and bottom polished surfaces and has a thickness of 625 μm, except on surface areas where porous silicon layers 17 are to be formed.

The anodization-resistant film 16 may be formed by any method and may be formed by a patterning technique that is widely used in the semiconductor process. The material and the thickness of the anodization-resistant film 16 are determined such that the anodization-resistant film 16 is not detached and does not dissolve during the formation of the porous silicon layers 17. For example, the anodization-resistant film 16 is made of silicon nitride, silicon oxide, a resist, a resin (acryl resin or epoxy resin), or wax (for example, Apiezon Wax (trade name) or Electron Wax (trade name)). Alternatively, the areas where the porous silicon layers 17 are to be formed may be of a p-type or a p+-type, and the area where the porous silicon layers 17 are not to be formed may be of a $p^-$-type or an n-type.

(2) Formation of Porous Silicon Layer (FIG. 3A)

The porous silicon layers 17 may be formed by the anodization of the single-crystal silicon substrate 15. In the anodization, an electric current is applied to the substrate in an aqueous solution containing hydrofluoric acid. The principal surface of the single-crystal silicon substrate 15 serves as a cathode.

The anodization proceeds only in the area where the anodization-resistant film 16 is not formed. The thickness of the porous silicon layers 17 is controlled, for example, by the duration of the anodization. The thickness of the porous silicon layers 17 is determined in view of the fact that the porous silicon layers 17 are eventually to be converted into the cavities 30. The porous silicon layers 17 may be formed from the top surface to the bottom surface of the single-crystal silicon substrate 15.

Figure 3B:
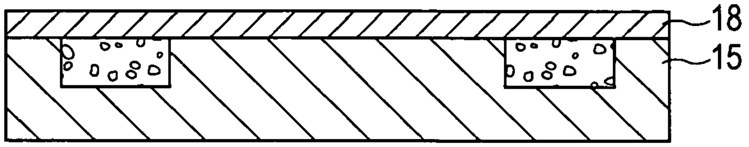

(3) Formation of Diaphragm (FIG. 3B)

The anodization-resistant film 16 is removed. Then, a non-porous single crystal diaphragm 18 is formed, for example, by thermal CVD, plasma CVD, molecular beam epitaxy (MBE), or liquid-phase epitaxy. The non-porous single crystal diaphragm 18 can be made of silicon.

When the anodization-resistant film 16 is made of single-crystal silicon, it need not to be removed. The porous silicon layers 17 may be selectively oxidized before the formation of the non-porous single crystal diaphragm 18.

Figure 3C:
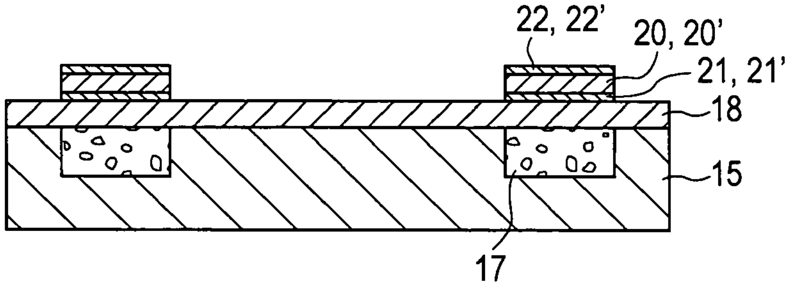

(4) Formation of Pressure-Generating Means (FIG. 3C)

A PZT piezoelectric substance layer 20 and accompanying electrode layers 21 and 22 may be formed on the non-porous single crystal diaphragm 18 formed on the porous silicon layer 17 in the following manner.

A common electrode layer 21, which is made of Pt, Cr and/or Ni and has a thickness of 1 μm; the piezoelectric substance layer 20, which is made of PZT and has a thickness of 10 μm, and an individual electrode layer 22, which is made of Pt, Cr and/or Ni, are formed on the non-porous single crystal diaphragm 18 by sputtering or ion plating. Then, a resist pattern serving as a mask is formed on the individual electrode layer 22. Then, ion etching or reactive ion etching of the common electrode layer 21, the individual electrode layer 22, and the piezoelectric substance layer 20 produces a common electrode 21', an individual electrode 22', and a piezoelectric substance 20'. At the same time, an oscillator and a wiring are formed.

Figure 3D:
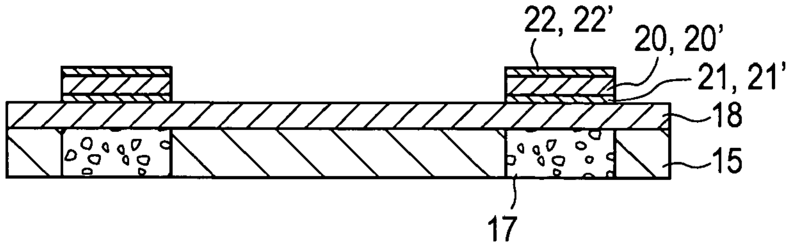
Figure 3E:
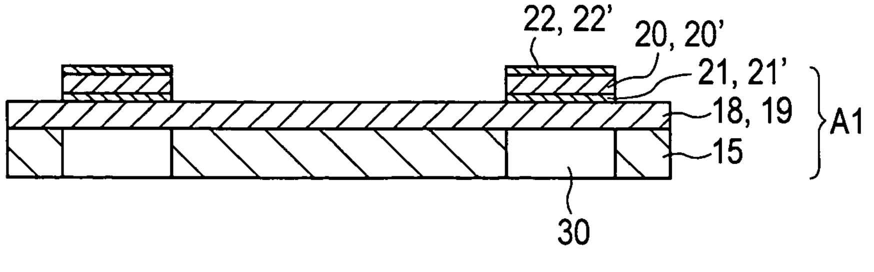

(5) Removal of Porous Layer (FIGS. 3D and 3E)

The porous silicon layers 17 are removed from the backside of the single-crystal silicon substrate 15. If the porous silicon layers 17 are exposed at the backside after the formation of the porous silicon layers 17, an exposure process will not be required. If the porous silicon layers 17 are not exposed at the backside, the single-crystal silicon substrate 15 is lapped, ground, polished, or etched to expose the porous silicon layers 17.

Then, the porous silicon layers 17 in the single-crystal silicon substrate 15 are etched, for example, with a solution containing hydrofluoric acid. A solution containing hydrofluoric acid is suitable for an etchant, in particular when the porous silicon layers 17 have previously been oxidized. However, the etchant is not limited to a solution containing hydrofluoric acid. If an oxide is not found on the porous wall of the porous silicon layers 17 or has previously been removed from the porous wall, an aqueous alkaline solution may also be used as an etchant.

The etching produces the cavities 30, an ink feed channel, and a common ink channel. At the same time, a thin film portion 19 made of a silicon single crystal is formed.

In the process (5), the single-crystal silicon substrate 15 is reduced in thickness and therefore is liable to break. Thus, it is desirable that, before the process (5), the single-crystal silicon substrate 15 be fixed on a supporting substrate, for example, with a resin, such as an adhesive or wax, or a double-faced adhesive tape.

Figure 4A:
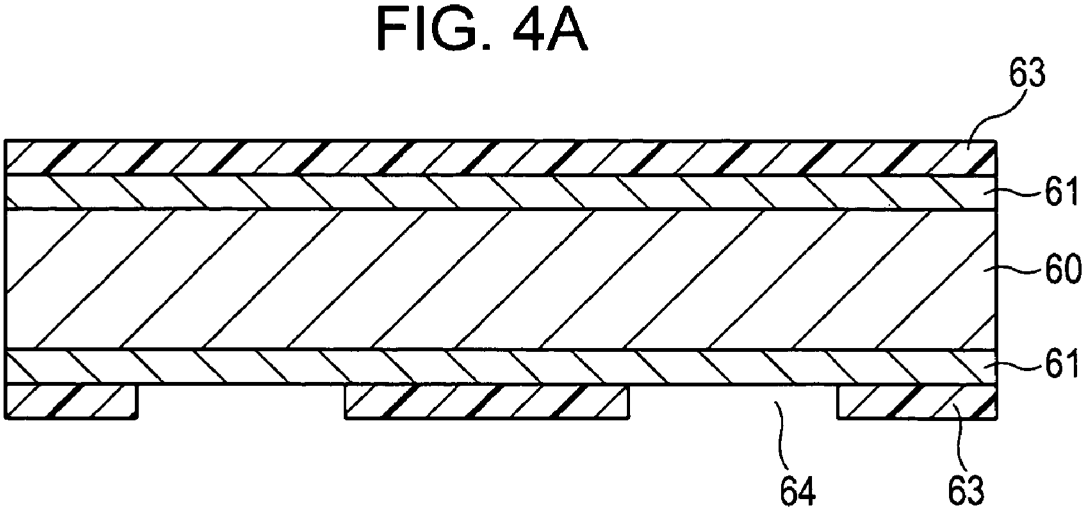
FIGS. 4A to 4C are schematic views illustrating a process for manufacturing a nozzle plate according to an embodiment of the present invention.
Figure 4B:
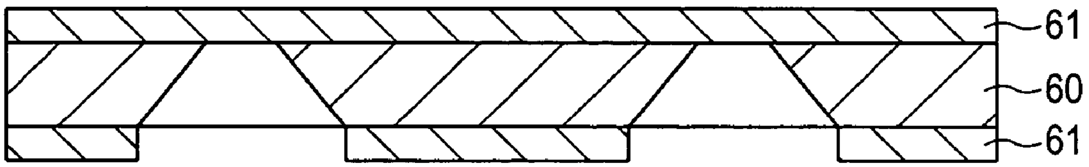
Figure 4C:
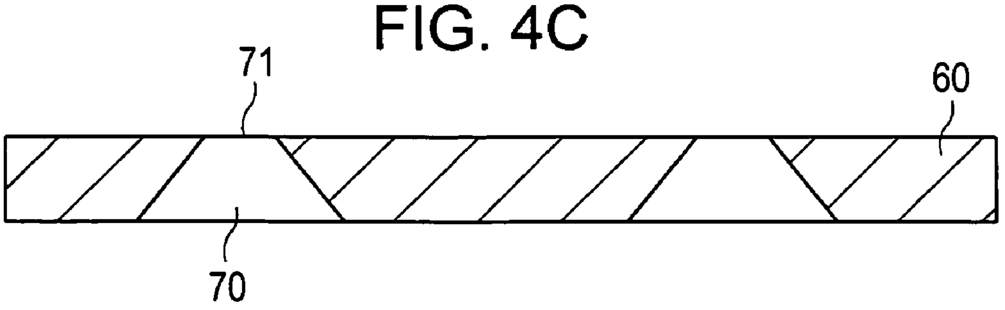

(6) Formation of Nozzle Plate (FIGS. 4A to 4C)

A manufacturing process and the structure of the nozzle plate A2 will be described below with reference to FIGS. 4A to 4C. The nozzle plate A2 may be made of any material that can form the nozzle. Examples of such a material include glass, a resin, and a single-crystal silicon substrate. A stable single-crystal silicon substrate that has the same coefficient of thermal expansion as that of the piezoelectric substrate A1 is suitable for the material. The nozzle may be formed in the following manner.

In FIGS. 4A to 4C, $SiO_2$ films 61 having a thickness of 0.1 μm are formed on the top surface and the bottom surface of a double-sided polished single-crystal silicon substrate 60 having a thickness of 100 μm by thermal oxidation. Then, a resist layer 63 is formed over the entire surface of the upper $SiO_2$ film 61. Another resist layer 63 is formed on the lower $SiO_2$ film 61, except the areas 64 corresponding to the openings of the cavities 30 in the piezoelectric substrate A1, so as to have a crystal edge in the [110] direction (FIG. 4A).

The $SiO_2$ film 61 at the areas 64 is removed by etching and then the resist layers 63 are removed. Then, the single-crystal silicon substrate 60 is anisotropically etched with a mixture of pyrocatechol, ethylenediamine, and water (FIG. 4B). Then, the $SiO_2$ films 61 are removed. In this way, nozzles 70 having an outlet 71, which is smaller in diameter than the openings of the cavities 30, are formed (FIG. 4C). The positions of the nozzles 70 coincide with the positions of the cavities 30.

Figure 3F:
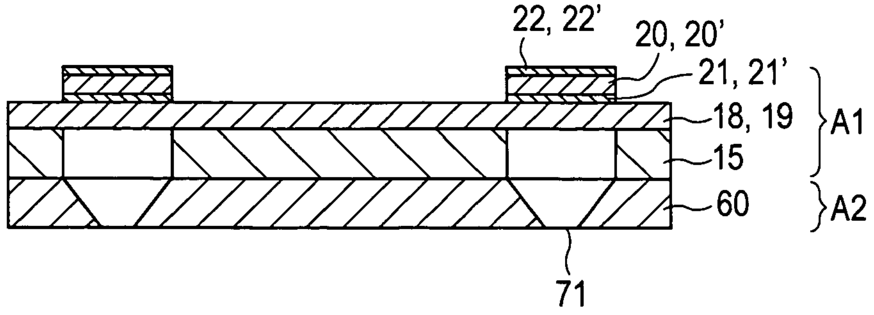

(7) Bonding of Piezoelectric Substrate A1 and Nozzle Plate A2 (FIG. 3F)

The piezoelectric substrate A1 is bonded to the nozzle plate A2 with the piezoelectric substance layer 20 and the nozzle outlet 71 facing outward. A voltage of 1000 V is applied between the negatively charged piezoelectric substrate A1 and the positively charged nozzle plate A2 at 400° C. to bond them anodically.

In the present invention, at least part of the side wall of the cavity 30 and the non-porous single crystal diaphragm (thin film portion) 18 are made of a silicon single crystal in one piece. The sidewall of the cavity 30 is perpendicular to the non-porous single crystal diaphragm 18 or tapers down to the nozzle outlet 71. The surface of the thin film portion 18 in the cavity 30 has bumps and dips having a height of at least 5 nm at intervals less than 50 nm (bumps and dips are also formed on the sidewall of the cavity 30 in FIG. 3E).

According to the present invention, the shape of the cavity is principally defined by the anodization from the diaphragm side. The shape of the anodized portion is uniform along the electric line of force. Thus, there are no hollows in the corners, unlike in the method using an SOI substrate. Furthermore, the sidewall of the cavity and the surface of the thin film portion in the cavity have bumps and dips, which have been formed by the etching of the porous silicon layer and have a height of at least 5 nm at intervals less than 50 nm. This improves the wettability of these surfaces by ink.

The thin film portion is made of a single-crystal silicon containing $5\times10^{17}/cm^3$ or less of oxygen. According to the present invention, the cavity is formed by selective etching of the porous silicon. Thus, for example, a mixture of hydrofluoric acid and nitric acid or oxygenated water is used instead of an alkaline solution. When the concentration of oxygen in the thin film portion is high, an oxygen precipitate is formed in the single-crystal silicon substrate by heat treatment. Thus, the oxygen precipitate in the thin film portion may be etched, causing damage to the thin film portion. When the concentration of oxygen in the thin film portion is $5\times10^{17}/cm^3$ or less, however, oxygen precipitation hardly occurs as compared with a typical CZ substrate, and therefore the thin film portion is rarely etched during the removal of the porous silicon layer. Widely commercialized silicon substrates made by the crystal pulling method (CZ method) contain over $1\times10^{18}/cm^3$ of oxygen, and the heat treatment thereof causes oxygen precipitation. But oxygen precipitation hardly occurs when the oxygen concentration is less than $5\times10^{17}/cm^3$.

The concentration of oxygen in the single-crystal silicon of the sidewall of the cavity is $5\times10^{17}/cm^3$ or more. The sidewall is often formed by alkaline etching. A higher oxygen concentration causes oxygen precipitation during the formation of a thin film, a PZT film, or peripheral circuitry. The oxygen precipitate is not etched during alkaline etching and acts as a mask when a cavity or an ink feed channel is formed, causing a problem that a desired shape cannot be obtained by the etching.

According to the present invention, the cavity is formed by selective etching of the porous silicon, for example, using a mixture of hydrofluoric acid and nitric acid or oxygenated water, instead of an alkaline solution. Thus, the problem described above does not occur.

Furthermore, the single-crystal silicon in the thin film portion is of a p-type or an n-type, and the single-crystal silicon constituting the sidewall of the cavity is of a p-type. The concentration of p-type carriers in the sidewall of the cavity is higher than that in the thin film portion.

The single-crystal silicon constituting the sidewall of the cavity is of a $p^+$-type. In addition to the selective etching of the porous silicon layer for the formation of the cavity, when etching is required to form the ink feed channel or the like, the $p^+$-type single-crystal silicon can be predominantly etched over a $p^-$-type or n-type single crystal epitaxial silicon of the thin film portion using a mixture of hydrofluoric acid, nitric acid, and acetic acid (J. Electrochem. Soc. 144 (1997) p. 2242). A 1:3:8 mixture of hydrofluoric acid, nitric acid, and acetic acid is recommended as an etchant. Such a hydrofluoric acid-based etchant can etch silicon oxide. Thus, the problem of the oxygen precipitate does not occur.

A hydrofluoric acid-based etchant cannot be used in selective etching of the conventional SOI wafer using silicon oxide as an etch stop layer. However, when an epitaxial silicon layer that is not of the $p^+$-type is used as the etch stop layer, as in the present invention, a hydrofluoric acid-based etchant can be suitably used.

Furthermore, since the thin film portion is made of epitaxial single-crystal silicon, it is free from crystal-originated particles (COP), which can form a through-hole in a thin film having a thickness less than 1 micron.

The method according to the present invention comprises a process for removing the porous silicon to form the cavity. According to the method of the present invention, unlike the conventional method, the shape of the cavity is principally defined by the anodization from the diaphragm side. The selection ratio of the selective etching of the porous silicon is at least 1000. Thus, the thin film portion maintains a uniform thickness during the removal of the porous silicon.

According to the present invention, the thickness of the single-crystal silicon thin film portion constituting the diaphragm can be reduced to about 0.1 to 50 μm. In addition, the diaphragm can be accurately formed in one piece since no adhesion process is required to be employed. Since the nozzle plate is made of the same material as the piezoelectric substrate, deformation due to a difference in the coefficient of thermal expansion between the nozzle plate and the piezoelectric substrate does not occur during or after their bonding. This also ensures high dimensional accuracy of the inkjet head. The reduced thickness of the oscillator allows a small cavity to generate a sufficient displacement at low voltage. Thus, a small, highly integrated, reliable inkjet head operable at low voltage can be provided at low cost. In addition, a shortened ink feed channel allows the inkjet head to remove air bubbles consistently.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2004-258367 filed Sep. 6, 2004, which is hereby incorporated by reference herein in its entirety.

What is claimed is:

1. A method for manufacturing an inkjet head, comprising steps of:

forming an anodization-resistant film on a predetermined area of one surface of a substrate made of single-crystal silicon;

forming a porous structure by making at least a part of an area of the one surface of the substrate on which the anodization-resistant film is not formed porous by an anodization method;

removing the anodization-resistant film;

forming a non-porous single crystal diaphragm on the one surface of the substrate including the porous structure by epitaxial growth;

forming a piezoelectric substance layer on the diaphragm formed on the porous structure;

reducing a thickness of the substrate from a side of another surface of the substrate; and forming a cavity by etching out the porous structure from the substrate.

2. The method for manufacturing an inkjet head according to claim 1, wherein the diaphragm is made of silicon.

3. The method for manufacturing an inkjet head according to claim 2, wherein a concentration of oxygen in the diaphragm is lower than that in the substrate.

4. The method for manufacturing an inkjet head according to claim 1, wherein the substrate is bonded to a nozzle plate including a nozzle after the cavity is formed in the substrate.

5. The method for manufacturing an inkjet head according to claim 4, wherein the nozzle in the nozzle plate is connected to the cavity.

6. The method for manufacturing an inkjet head according to claim 4, wherein the nozzle plate has a coefficient of thermal expansion equal to that of the substrate.

7. The method for manufacturing an inkjet head according to claim 1, further compromising:

fixing the substrate on a supporting substrate.

8. A method for manufacturing an inkjet head according to claim 1, wherein the porous structure is formed through the substrate from the area of the one surface on which the anodization-resistant film is not formed to the other surface of the substrate.

* * * * *